(12) United States Patent
Fischer et al.

(10) Patent No.: US 7,690,727 B2
(45) Date of Patent: Apr. 6, 2010

(54) MOTOR VEHICLE SEAT BACK STRUCTURE FOR A MOTOR VEHICLE SEAT

(75) Inventors: Markus Fischer, Itzgrund (DE); Matthias Hoffmann, Sesslach (DE); Andrea Bauersachs, Ebersdorf (DE); Michael Forkel, Coburg (DE); Jochen Hofmann, Marktgraitz (DE); Alwin Macht, Ebensfeld (DE); Georg Scheck, Weitramsdorf (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 12/360,772

(22) Filed: Jan. 27, 2009

(65) Prior Publication Data

US 2009/0134680 A1    May 28, 2009

Related U.S. Application Data

(62) Division of application No. 10/570,636, filed as application No. PCT/DE2004/001896 on Aug. 25, 2004, now Pat. No. 7,488,039.

(30) Foreign Application Priority Data

Sep. 4, 2003    (DE)    .............................. 203 13 925 U

(51) Int. Cl.
    B60N 2/66    (2006.01)
(52) U.S. Cl. ................................................. 297/284.4
(58) Field of Classification Search ............... 297/284.4
    See application file for complete search history.

(56) References Cited

U.S. PATENT DOCUMENTS

| 4,313,637 A | 2/1982 | Barley |
| 4,354,709 A | 10/1982 | Schuster |
| 4,452,485 A | 6/1984 | Schuster |

(Continued)

FOREIGN PATENT DOCUMENTS

DE    199 24 591 A1    11/2000

(Continued)

OTHER PUBLICATIONS

International Search Report, dated Jan. 12, 2005, corresponding to PCT/DE2004/001896.

(Continued)

*Primary Examiner*—Rodney B White
(74) *Attorney, Agent, or Firm*—Christie, Parker & Hale, LLP

(57) ABSTRACT

A motor vehicle seat back structure comprising a backrest support frame which consists of a surface turned towards the seat user's back, a lordosis support which is arranged on the front part of the backrest support frame for supporting the user's back and an adjusting device for vertically adjusting the lordosis support position with respect to the extension plane of said backrest support frame. The adjusting device comprises at least one adjusting element operably connected to the lordosis support and at least one sliding element which is displaceable with respect to said adjusting element and interacts therewith in such a way that when the sliding element moves, the adjusting element is displaced with a directional component perpendicularly to the displacement direction of the sliding element and performs an action on said lordosis support in the direction.

22 Claims, 11 Drawing Sheets

U.S. PATENT DOCUMENTS

| | | |
|---|---|---|
| 4,541,670 A | 9/1985 | Morgenstern et al. |
| 4,632,454 A | 12/1986 | Naert |
| 5,050,930 A | 9/1991 | Schuster et al. |
| 5,217,278 A | 6/1993 | Harrison et al. |
| 5,385,531 A * | 1/1995 | Jover .................. 297/284.4 X |
| 5,449,219 A | 9/1995 | Hay et al. |
| 5,716,098 A | 2/1998 | Lance |
| 5,718,476 A | 2/1998 | De Pascal et al. |
| 5,769,490 A | 6/1998 | Falzon |
| 5,913,569 A | 6/1999 | Klingler |
| 5,954,399 A | 9/1999 | Hong |
| 6,338,530 B1 | 1/2002 | Gowing |
| 6,536,840 B1 * | 3/2003 | Schuster et al. .......... 297/284.4 |
| 6,616,227 B2 | 9/2003 | Blendea et al. |
| 6,676,214 B2 | 1/2004 | McMillen et al. |
| 6,682,144 B2 | 1/2004 | Klingler |
| 6,893,089 B2 | 5/2005 | McMillen et al. |
| 7,011,369 B2 | 3/2006 | Massara et al. |
| 7,201,446 B2 | 4/2007 | Massara et al. |
| 7,237,847 B2 | 7/2007 | Hancock et al. |
| 7,270,374 B2 | 9/2007 | Moriggi |
| 7,488,039 B2 * | 2/2009 | Fischer et al. ............ 297/284.4 |
| 2002/0113471 A1 | 8/2002 | Blendea et al. |
| 2002/0113472 A1 * | 8/2002 | Blendea et al. .......... 297/284.4 |
| 2003/0006635 A1 | 1/2003 | Klingler |
| 2007/0228789 A1 | 10/2007 | McMillen |

FOREIGN PATENT DOCUMENTS

| | | |
|---|---|---|
| DE | 201 00 018 U1 | 3/2002 |
| DE | 101 45 206 A1 | 3/2003 |
| EP | 0 458 440 A1 | 11/1991 |
| EP | 0 808 746 A3 | 11/1997 |
| EP | 1 082 233 B1 | 3/2001 |
| JP | 58170638 | 3/1982 |
| JP | 6-278511 | 10/1994 |
| WO | WO 03/031222 A1 | 4/2003 |

OTHER PUBLICATIONS

Patent Abstract of Japan, Publication No. 58170638, Published on Mar. 31, 1982, in the name of Sakamoto.

Patent Abstract of Japan, Publication No. 06278511, Published on Oct. 4, 1993, in the name of Kuwabara.

English Translation of International Preliminary Report, dated Jul. 3, 2006, corresponding to PCT/DE2004/001896.

Patent Abstracts of Japan, Publication No. 58170638 A, Published on Oct. 7, 1983, in the name of Sakamoto.

* cited by examiner

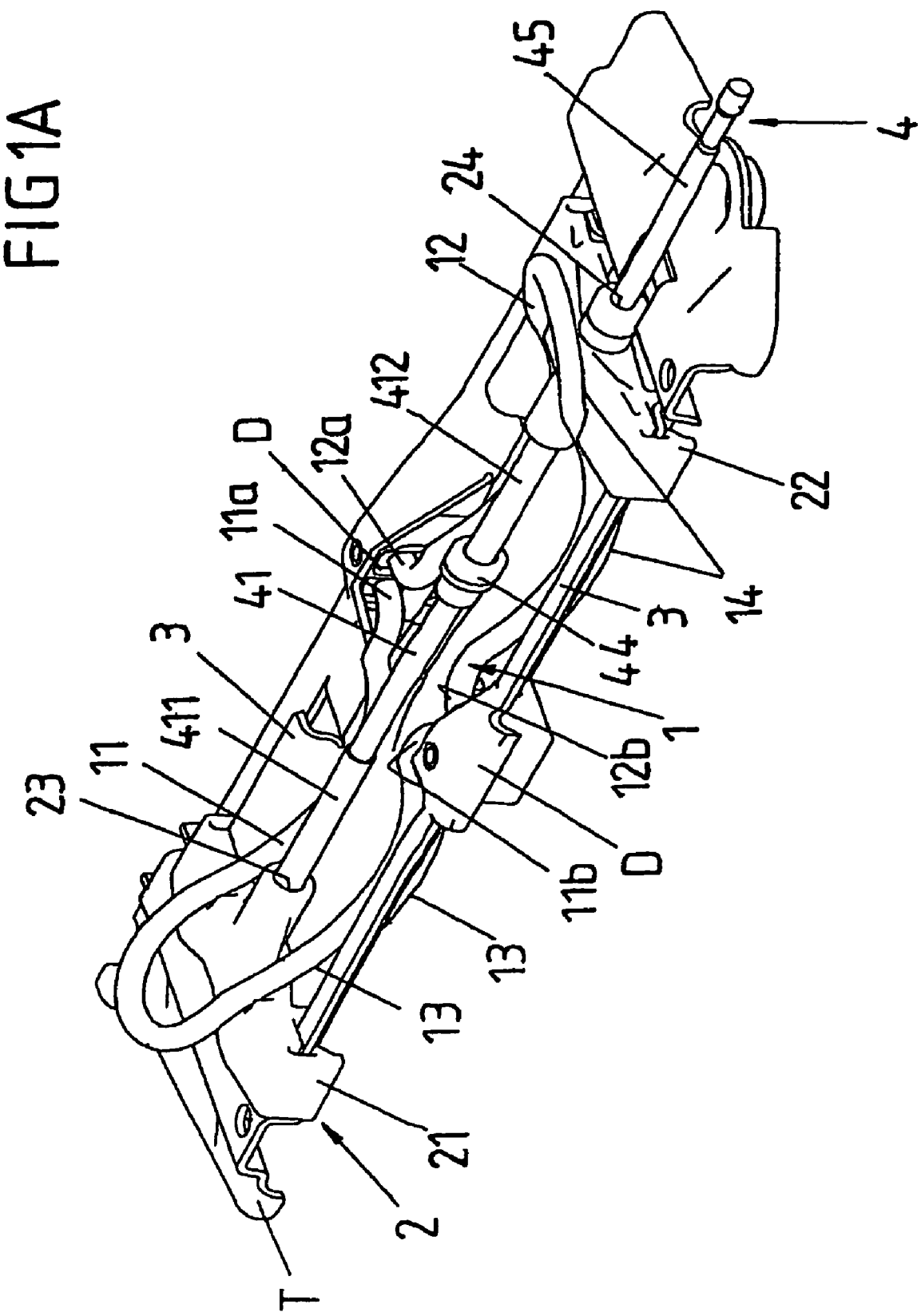

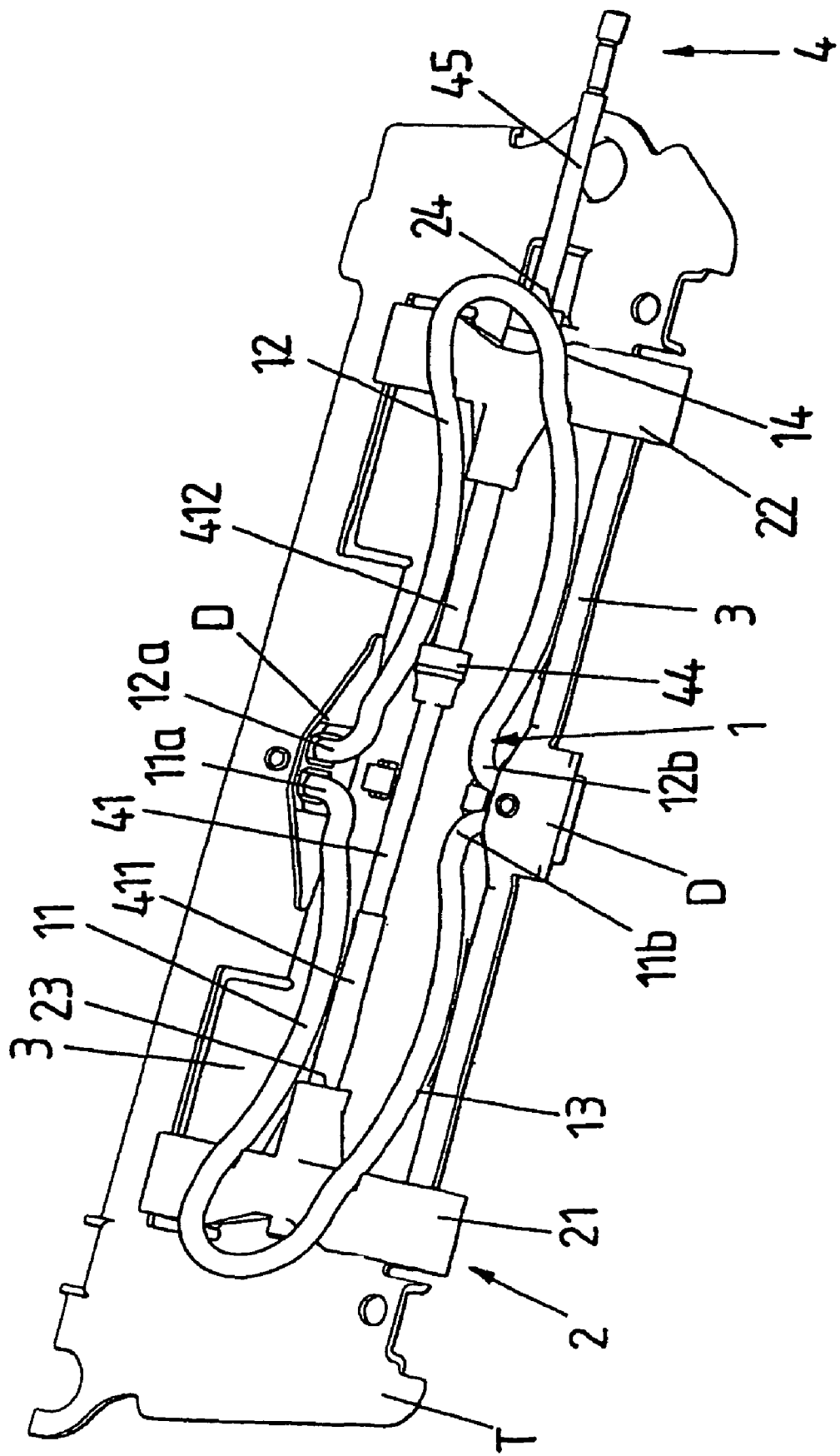

FIG 3C
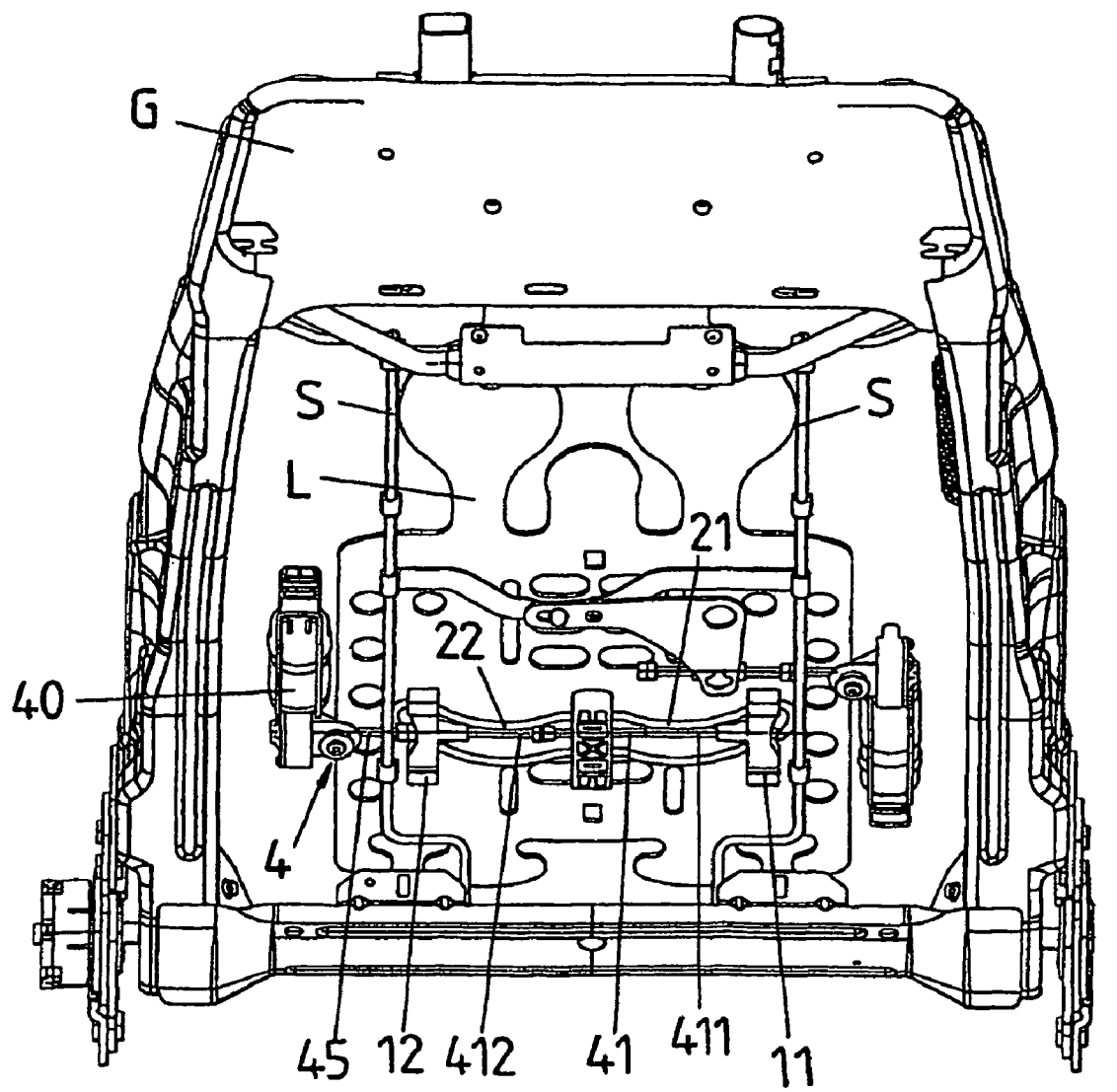
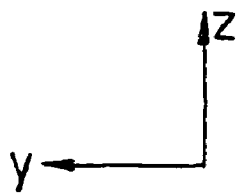

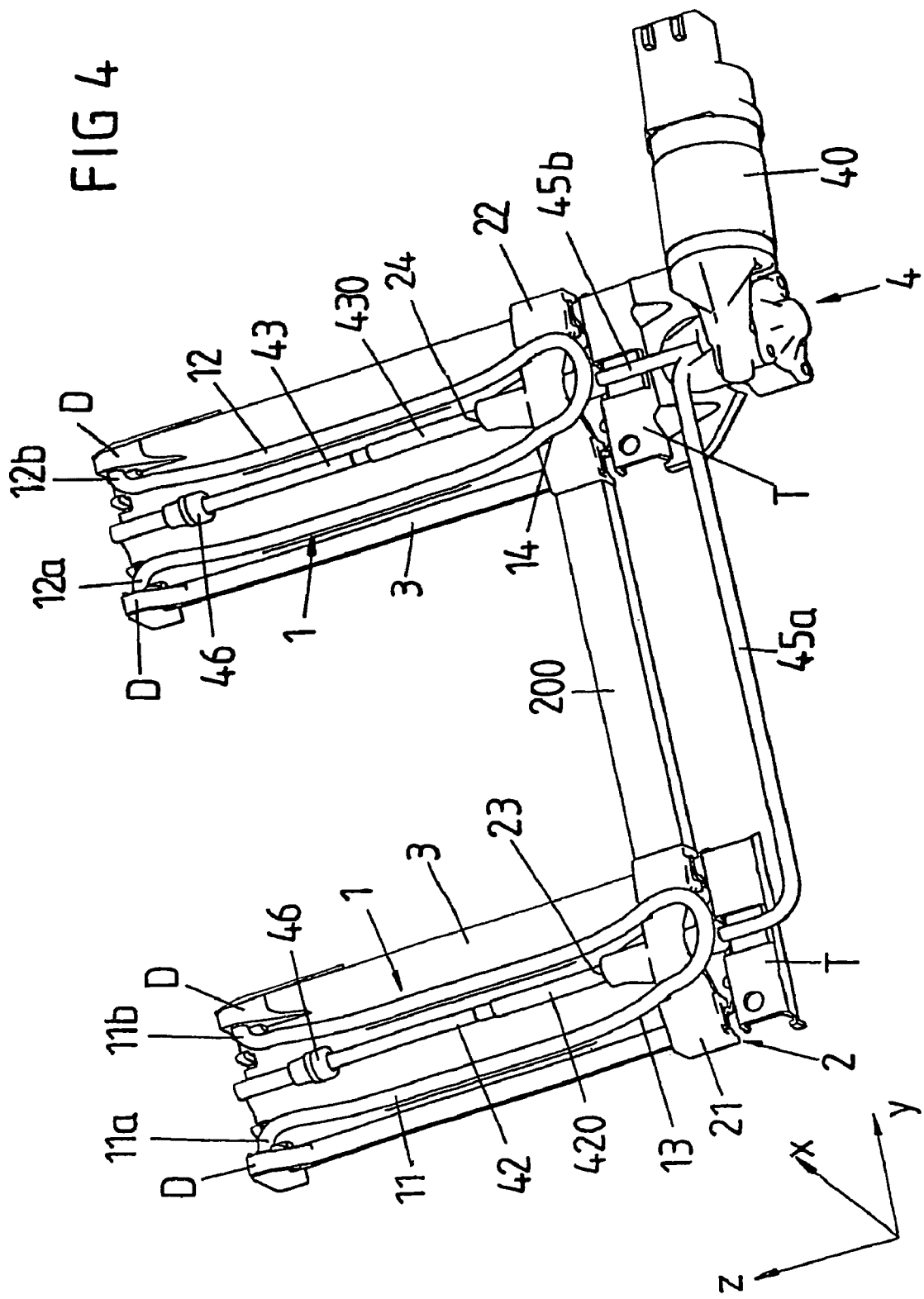

FIG 5
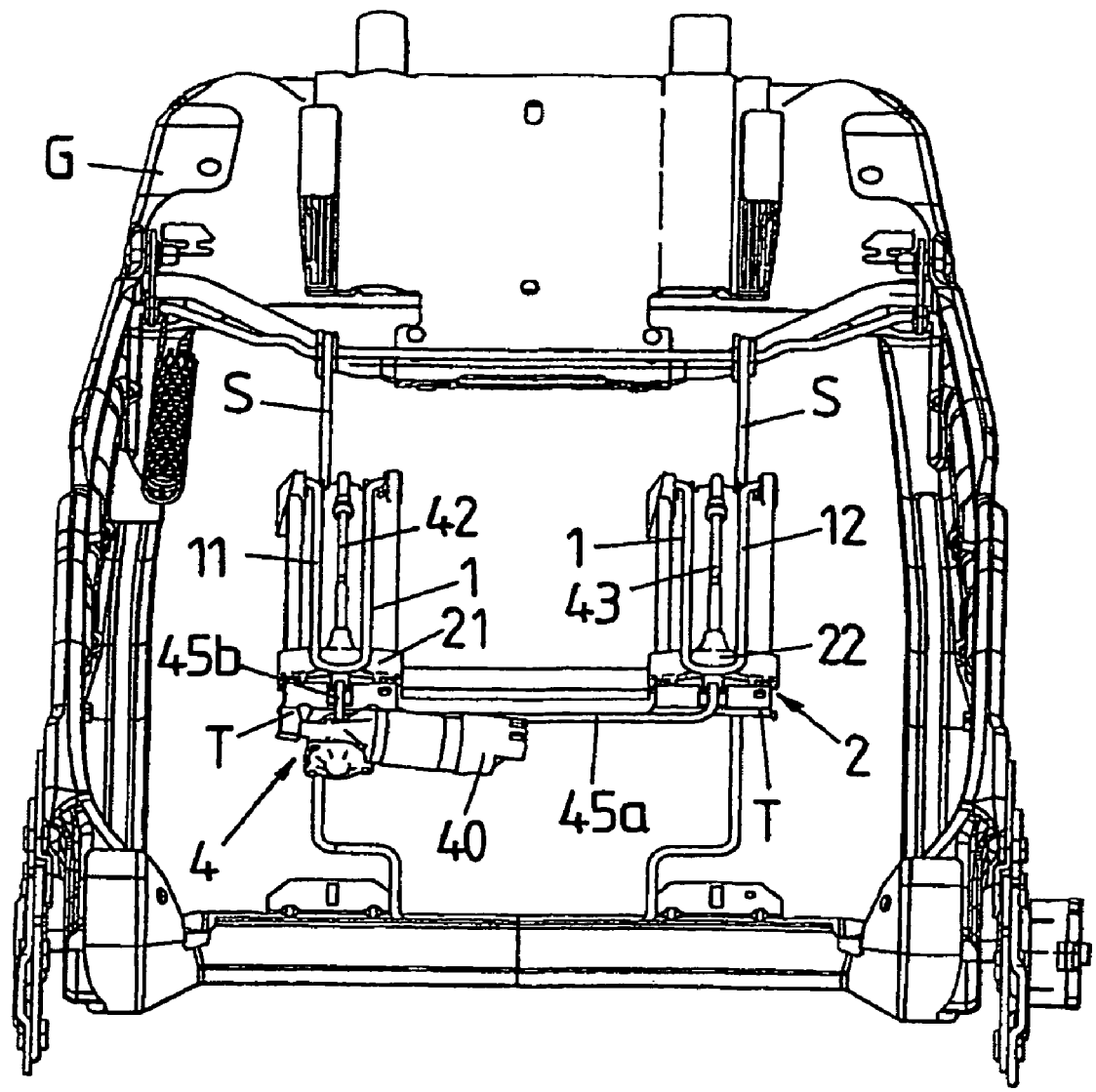
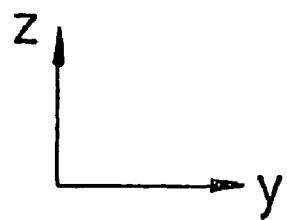

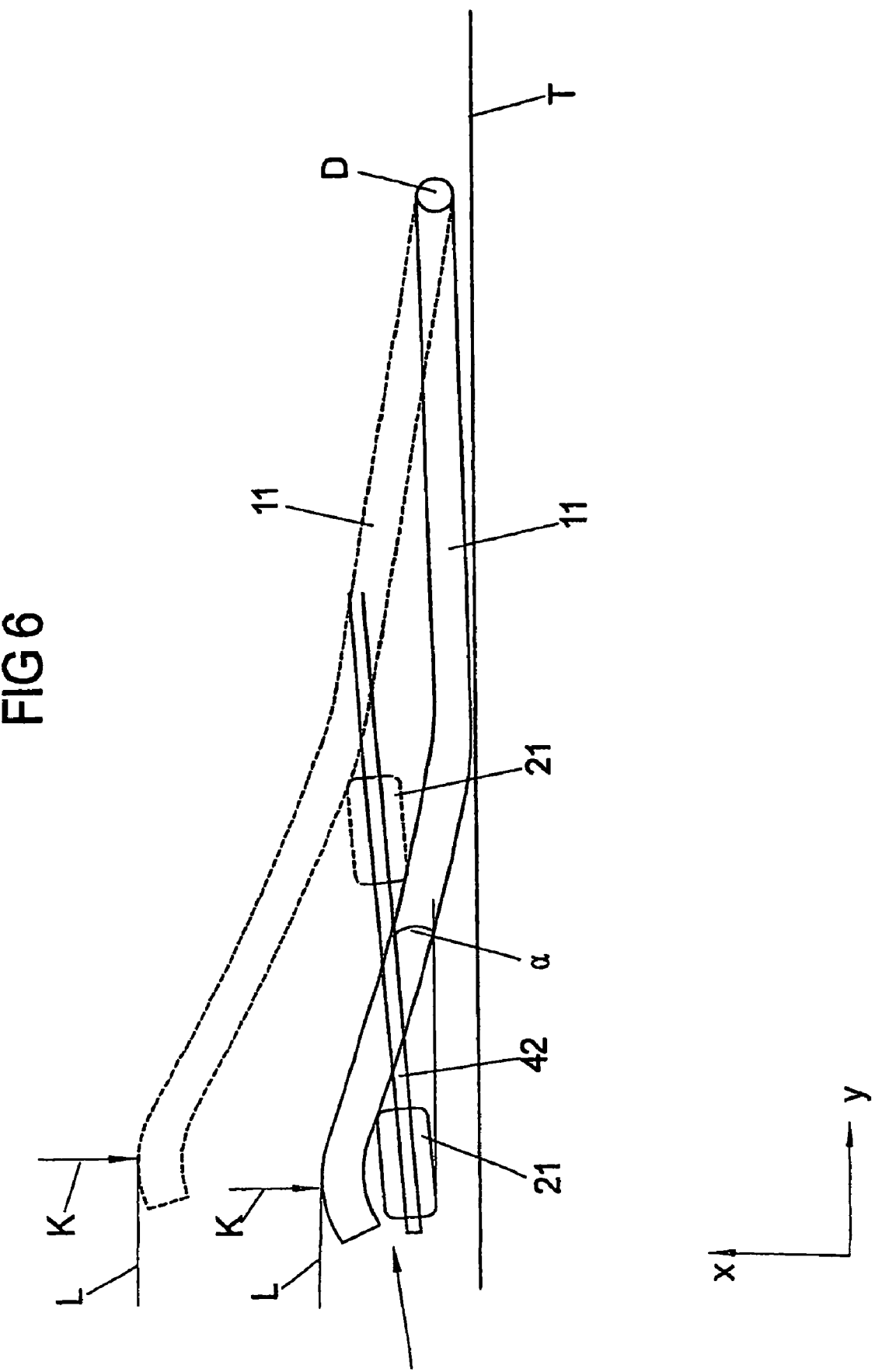

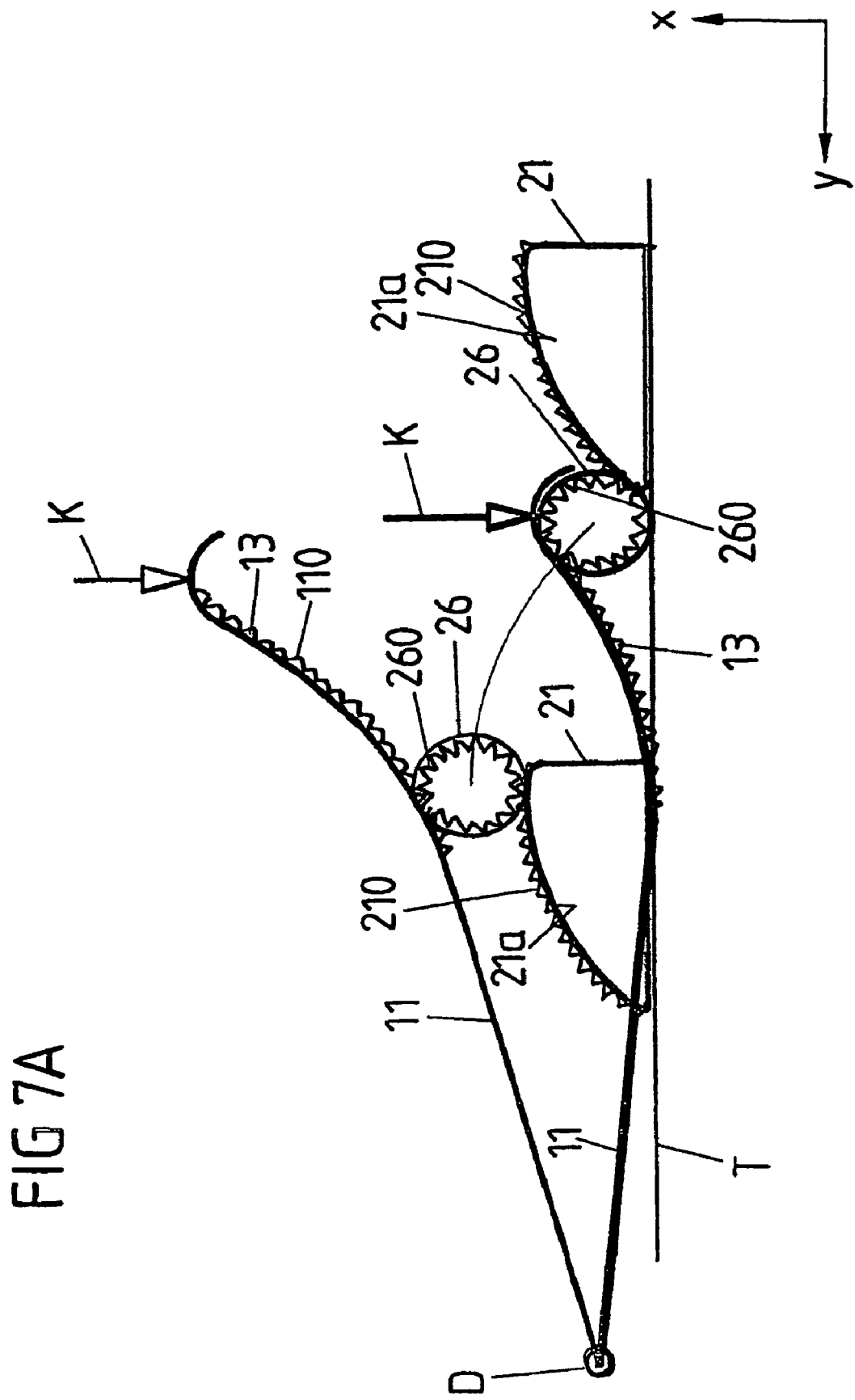

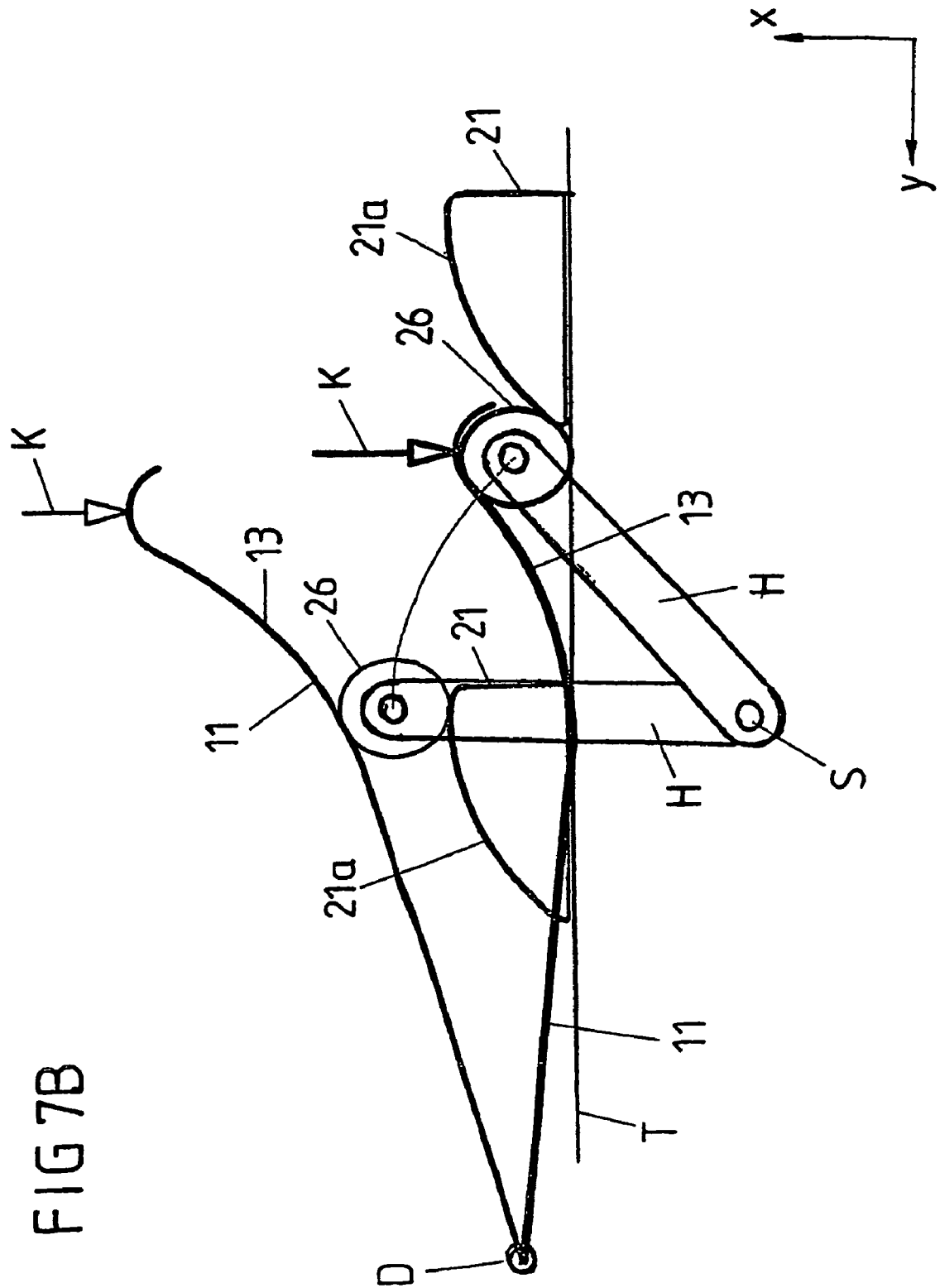

MOTOR VEHICLE SEAT BACK STRUCTURE FOR A MOTOR VEHICLE SEAT

CROSS-REFERENCE TO RELATED APPLICATION(S)

This application is a divisional application of U.S. Ser. No. 10/570,636, now U.S. Pat. No. 7,488,039, which is a National Phase Patent Application of International Application Number PCT/DE2004/001896, filed on Aug. 25, 2004, which claims priority of German Utility Model Number 203 13 925.9, filed on Sep. 4, 2003, the disclosures of which are incorporated fully herein by reference.

BACKGROUND

The invention relates to a backrest structure for a motor vehicle seat.

A backrest structure of this kind comprises a backrest frame which has a front side facing the back of the seat user and along which the spinal column of the seat user extends in the longitudinal direction of the seat back when the seat is in use; a lordosis support mounted on the front of the backrest frame for supporting the back of a seat user, as well as an adjusting device for adjusting the position of the lordosis support perpendicular to the extension plane of the backrest frame in order to adjust the curvature of a backrest cushion which is mounted in front of the backrest frame and the lordosis support and through which the back of a vehicle occupant is supported on the lordosis support.

The object of the invention is to improve a backrest structure of the type mentioned at the beginning with regard to the structural space required, namely in particular with regard to the structural space required in the adjusting direction of the lordosis support, i.e. along a direction substantially perpendicular to the extension plane of the backrest frame.

BRIEF DESCRIPTION

According to this the adjusting device comprises at least one adjusting element which is in active connection with the lordosis support and at least one slider which is movable relative to the adjusting element (by sliding) and which interact with each other through a ramp according to the wedge principle so that as the slider moves so the adjusting element is moved with a component perpendicular to the direction of movement of the slider.

The solution according to the invention is based on the knowledge that a flat construction of the adjusting device of the lordosis support can be reached if in order to adjust the position of the lordosis support perpendicular to the extension plane of the backrest frame a slider is used which is moved substantially along the extension plane of the backrest frame or slightly inclined thereto and thereby interacts through a ramp with an adjusting element so that its position is adjusted (together with the lordosis support itself) transversely to the direction of movement of the slider.

According to a preferred embodiment of the invention the ramp through which the slider and the adjusting element of the lordosis support interact are designed curved so that the incline of the ramp varies (as opposed to a ramp with a flat surface of constant incline). The relevant translation of a sliding movement of the slider into an adjusting movement of the adjusting element transversely to the displacement direction can be purposefully set dependent on position (in relation to the position of the slider).

The displacement movement of the slider can take place more particularly in the longitudinal direction of the backrest (corresponding to the extension direction of the spinal column of a seat user with an orderly use of the motor vehicle seat) or perpendicular to the seat back longitudinal direction, but likewise with a component parallel to the extension plane of the backrest frame.

The corresponding movement of the slider along a direction with at least one component parallel to the extension plane of the backrest frame is thereby converted by the ramp into the desired adjusting movement of the lordosis support across the extension plane of the backrest frame. For a defined movement through sliding, the slider is assigned a guide rail along which the slider is guided.

In order to generate the adjusting force required for moving the slider a drive is used, more particularly in the form of a spindle drive or a lever drive which preferably has a drive motor to generate the mechanical energy. To connect the drive motor to the corresponding spindle or lever gearing it is thereby possible to use at least one flexible shaft so that to adapt to the space requirements in each individual case a different arrangement of the drive motor relative to the relevant gearing of the adjusting drive is possible.

If for a symmetrical introduction of the adjusting force into the at least one adjusting element assigned to the lordosis support a number of sliders, more particularly two sliders are provided which each act through displacement on the or each adjusting element then a single drive motor is preferably used for actuating both sliders.

It can hereby be proposed on the one hand that the two sliders are moved oppositely to each other, namely in particular transversely to the longitudinal direction of the seat back. The simultaneous opposing movement of the two sliders for acting on the or each adjusting element can be obtained by way of example by a spindle which has two threaded sections with opposite thread pitch, thus one section with a so-called left-hand thread and one section with a so-called right-hand thread whereby one of the two sliders is moved by each of the two spindle sections so that during rotational movement of the spindles along a defined direction the two sliders (corresponding to the contra pitch of the two threaded sections) are moved in the opposite direction.

According to another embodiment of the invention two sliders are mounted spaced from each other transversely to the longitudinal direction of the backrest and are moved parallel to each other along the longitudinal direction of the backrest in order to generate an adjusting movement.

The ramp-like preferably curved surface through which the at least one slider interacts with the or each adjusting element is preferably provided on the relevant adjusting element, formed by way of example as a support yoke.

According to a further preferred development of the invention a rotational symmetrical element, more particularly in the form of a roller body is preferably mounted between the at least one slider and the associated adjusting element and during movement of the slider relative to the adjusting element rolls down along a surface which runs inclined to the direction of movement of the slider. An increased translation ratio is hereby reached when the movement of the relevant slider is converted into an adjusting movement of the associated adjusting element. This can be used to further reduce the structural height of the adjusting device. Furthermore the friction is reduced which occurs during interaction of the relevant slider with an adjusting element since the slider and the adjusting element no longer interact directly but through a rotationally symmetrical element.

For a defined entrainment of the rotationally symmetrical element during movement of the slider the latter can interact through external toothing with a corresponding toothing of the associated inclined face of the slider. Alternatively the rotationally symmetrical element can be guided by way of example by a lever assembly.

BRIEF DESCRIPTION OF THE DRAWINGS

Further features and advantages of the invention will now be explained in the following description of embodiments with reference to the drawings.

FIG. 1a is a first perspective view of an adjusting device for adjusting the position of a lordosis support for a backrest of a motor seat.

FIG. 1b is a second perspective view of an adjusting device for adjusting the position of a lordosis support for a backrest of a motor seat.

FIG. 3c is a rear view of the backrest frame of FIGS. 3a and 3b.

FIG. 4 is a modification of the adjusting device of FIGS. 1a and 1b.

FIG. 6 is a diagrammatic view of a further development of the adjusting device of FIGS. 4 and 5.

FIG. 7a is a first diagrammatic illustration of two further developments of the adjusting device of FIGS. 1a and 1b and of FIG. 4.

FIG. 7b is a second diagrammatic illustration of two further developments of the adjusting device of FIGS. 1a and 1b and of FIG. 4.

DETAILED DESCRIPTION

Figure 2:
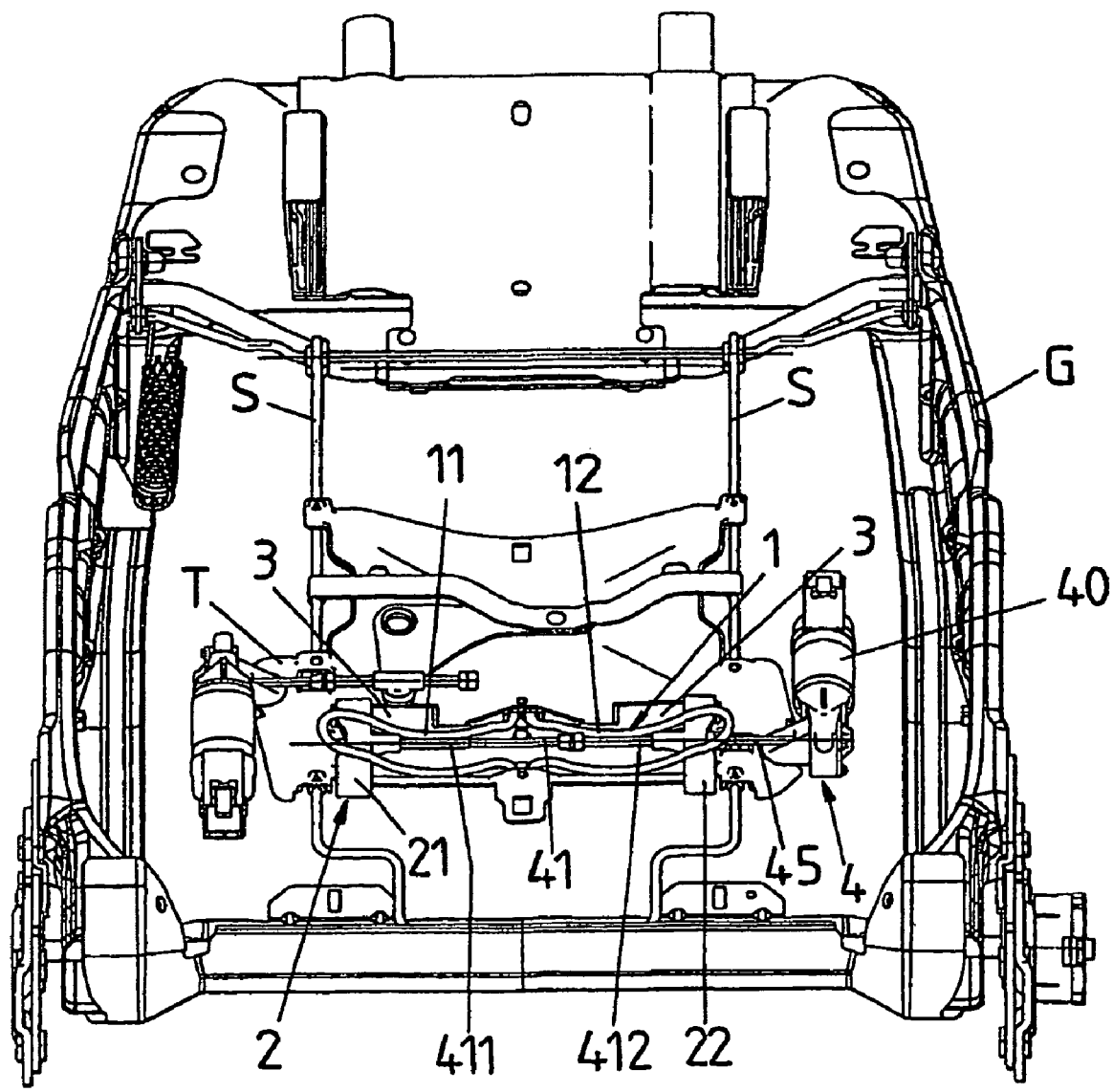
FIG. 2 shows the adjusting device of FIGS. 1a and 1b installed in a backrest frame of a backrest.
Figure 3A:
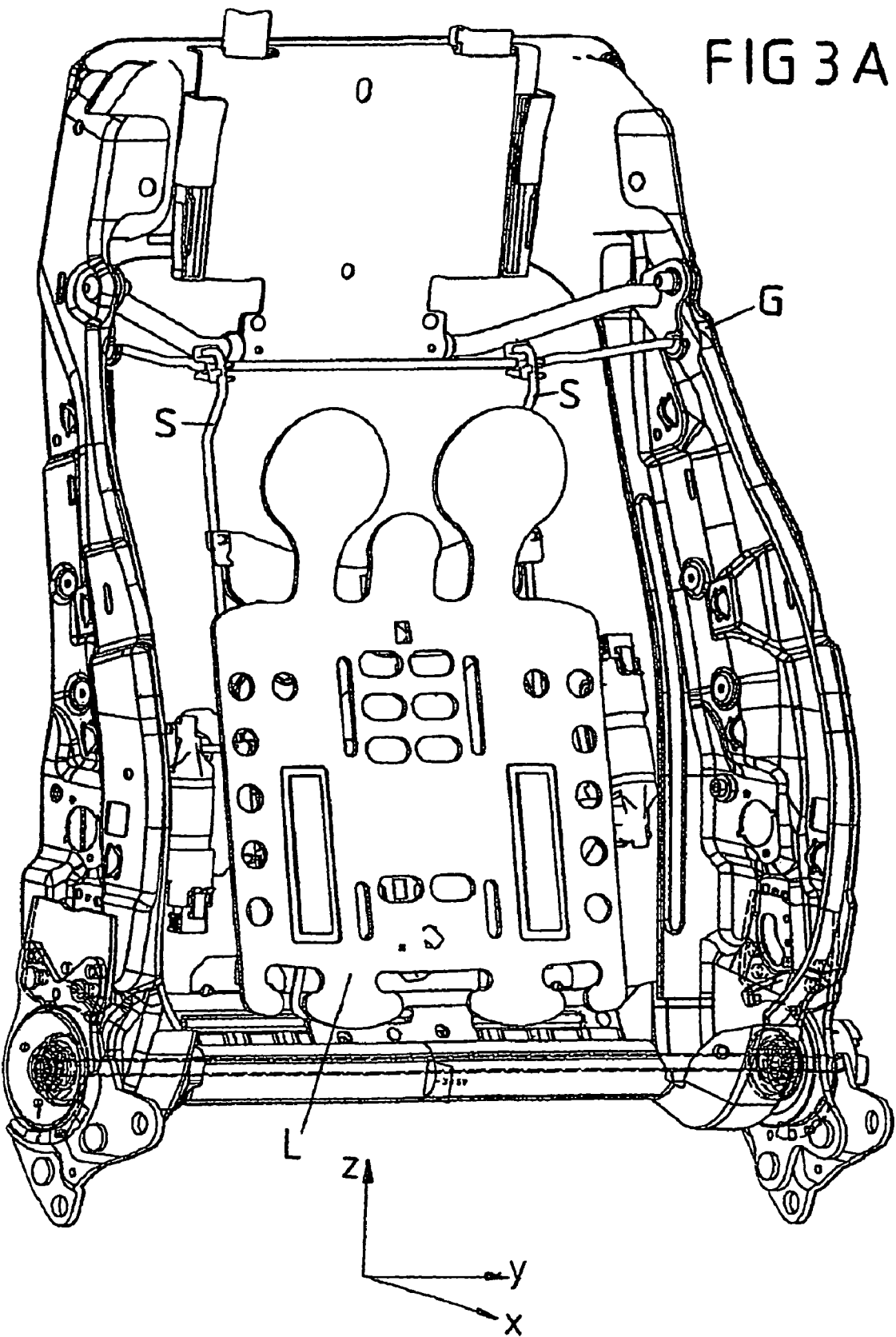
FIG. 3a shows the backrest frame of FIG. 2 in a front view with an additional lordosis support.
Figure 3B:
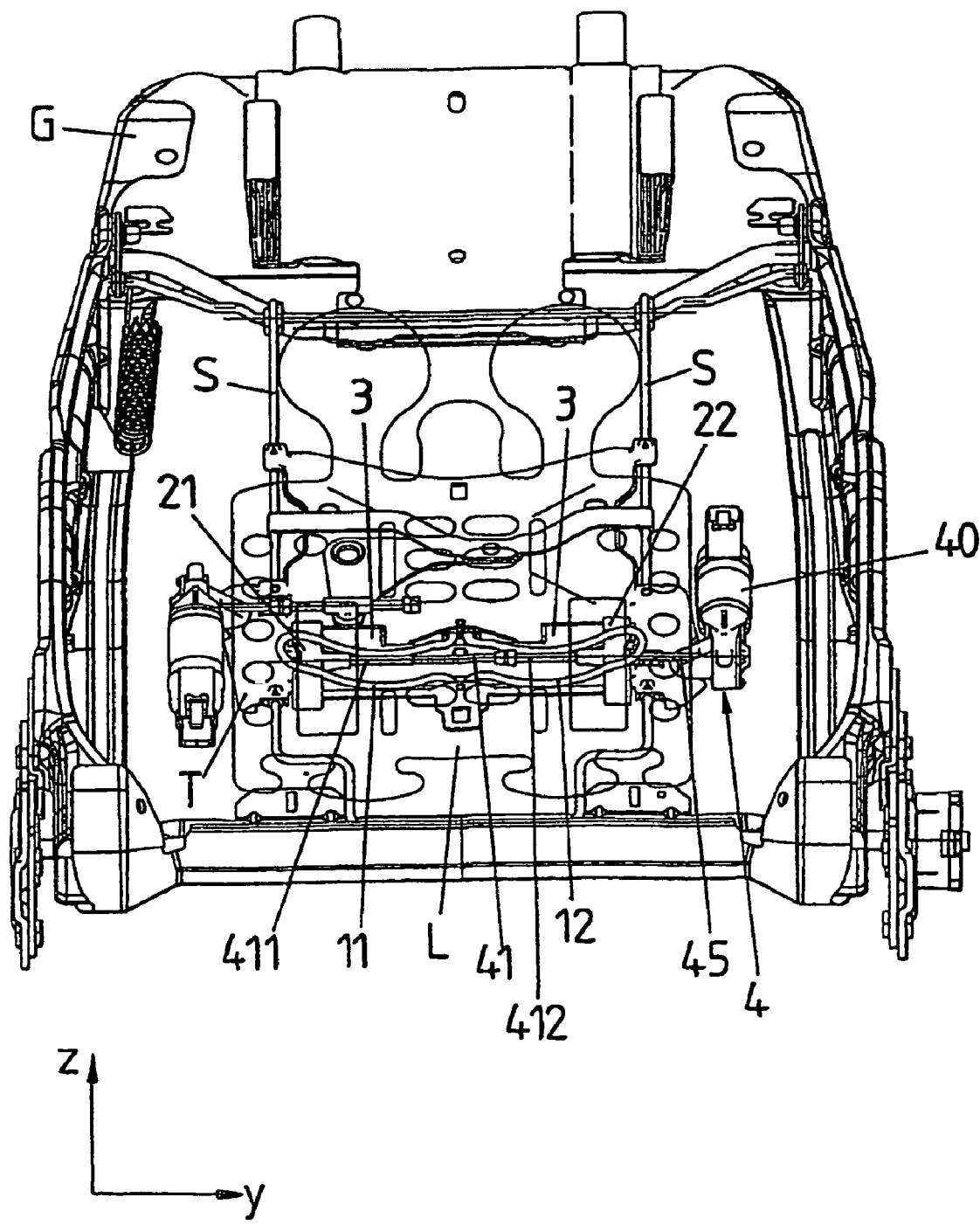
FIG. 3b is a view of the backrest frame according to FIG. 3b whereby the lordosis support is shown in outline.

A first embodiment of a lordosis support for a backrest of a motor vehicle seat will now be explained below with reference to FIGS. 1a, 1b and 2 as well as to FIGS. 3a to 3c. FIGS. 1a and 1b thereby show the adjusting device as such; FIG. 2 shows the adjusting device together with the backrest frame of a backrest; and FIGS. 3a to 3c show in additional to the backrest frame and the adjusting device also the lordosis support which is to be adjusted.

In FIGS. 2 and 3a to 3c a supporting structure of a backrest in the form of a backrest frame G has two spaced struts S each extending in the longitudinal direction of the backrest and in front of which is mounted a lordosis support L. This is mounted by way of example on the backrest frame G by spring elements (not shown in these drawings).

By backrest longitudinal direction z is currently meant that direction along which with an ordinary use of the backrest on a motor vehicle seat extends the spinal column of a person seated on the corresponding vehicle seat. With an upright setting of the backrest, i.e. when the backrest protrudes substantially perpendicular from the seat cushion, the backrest longitudinal direction z runs substantially along the vertical vehicle axis. The backrest frame G as well as the lordosis support L thereby each lie substantially in one plane which is spanned by the backrest longitudinal axis z as well as the horizontal transverse axis y running perpendicular thereto.

The following relates to the adjustment of the position or curvature of the lordosis support L which is designed here as a flexible lordosis mat along a direction x which runs perpendicular to the plane spanned by the backrest longitudinal axis z and the horizontal transverse axis y. For this an adjusting device is attached to the struts S of the backrest frame G running along the backrest longitudinal direction z, as will be explained below with reference to FIGS. 1a, 1b, 2 and 3a to 3c.

The adjusting device is mounted on a support T in the form of a support plate which is fixed by suitable fixing means on the struts S which extend in the backrest longitudinal direction. The support R thereby extends along the horizontal transverse direction y (thus perpendicular to the backrest longitudinal direction z) from the one longitudinal strut S to the other longitudinal strut S and has roughly in the middle rotational bearings D on which two support yokes 11, 12 are fitted for pivotal movement.

Each of the two support yokes 11, 12 extend from the two ends 11a, 11b and 12a, 12b attached for pivotal movement to the rotational bearings D, up to one of the two side edges of the support T. Angled end sections of the substantially U-shaped support yokes 11, 12 thereby serve as bearing sections 11a, 11b and 12a, 12b of the support yokes. The U-shaped support yokes 11, 12 are not flat but rather have a curvature so that they each define a ramp with variable curvature which interacts with an associated slider 21, 22 of a slider assembly 2.

The two sliders 21, 22 are guided on each guide rail 3 formed or mounted on the support plate T in the extension direction of the arms of the U-shaped support yoke 11, 12. They thereby engage underneath the two support yokes 11, 12 at their curved sections 13, 14 and interact with these in the manner of a ramp on the wedge-principle.

The two sliders 11, 12 are each movable oppositely along the relevant associated guide rail 3 along the horizontal transverse direction y by a spindle drive 4. The spindle drive 4 comprises a drive motor 40 which drives a drive shaft 45. This in turn is connected rotationally secured with a spindle 41 with a centring element 44 which has two threaded sections 411, 412 with threads of opposite pitch, namely a threaded section 411 with a left-hand thread and a threaded section 412 with a right-hand thread. Each of the two threaded sections 411, 412 interacts with an associated internal thread 23, 24 which are each formed in one of the two sliders 21, 22. The corresponding internal threads 23, 24 can thereby each be selectively formed by a spindle nut which is each mounted, more particularly pressed into one of the two sliders 21, 22 or can be moulded in one piece in the relevant slider 21 and 22.

As a result of the different pitch of the two threaded sections 411, 412 of the threaded spindle 4, as the threaded spindle 4 turns so, depending on the direction of rotation, the two sliders 21, 22 are moved in opposite directions either up towards each other (towards the centre of the support plate T) or away from each other (each towards a side edge of the support plate T). As a result of the interaction of the sliders 21, 22 with the relevant associated curved, ramp-type section 13, 14 of the one or other support yoke 11, 12, as the sliders 21, 22 move towards each other (towards the centre of the support plate T) the support yokes 11, 12 are pivoted about their relevant rotational bearing D so that they act on the lordosis support L and move this along the direction x perpendicular to the plane spanned by the backrest longitudinal direction z and the horizontal transverse direction y away from the support plate T whereby the position of the lordosis support L changes along that direction x and/or the lordosis support L is curved in this direction—depending on whether the bearing of the lordosis support L (in the form of a lordosis mat) on the seat frame G permits a displacement of the lordosis support L along the said direction x or only a curvature. If the two sliders 21, 22 are moved on the other hand in the opposite direction each towards one of the two side edges of the support plate T then the support yokes 11, 12 are folded in the direction of the support plate T so that the curvature of the lordosis support L yields and the lordosis support L moves up closer to the support plate T once more.

As a result it is possible by sliding the sliders 21, 22 along a direction y parallel to the extension plane of the backrest support G by the support yokes 11, 12 to adjust the position or curvature of the lordosis support y along a direction x perpendicular to the extension plane (yz-plane) of the backrest frame G. This is due to the fact that the sliders 21, 22 interact with correspondingly curved sections 13, 14 of the support yokes 11, 12 according to the wedge principle so that a movement of the sliders 21, 22 along a direction y parallel to the extension plane (yx-plane) of the backrest frame G is converted into a movement of the support yokes 11, 12 (namely into a pivotal movement about the rotational bearing D of the support yokes 11, 12) which has a component in the direction x perpendicular to the extension plane of the backrest frame.

The adjusting device 1, 2, 3, 4 is characterised by a small structural height along the adjusting direction x so that it only requires little structural space between the backrest frame G and the lordosis support L. Furthermore it is characterised by a simple construction with few component parts, sliders 21, 22 displaceable on a support plate T with associated support yokes (11, 12) and easy assembly properties.

Through the symmetrical arrangement of the two support yokes 11, 12 and the associated sliders 21, 22 relative to an axis of symmetry running in the backrest longitudinal direction z a symmetrical uniform curvature or adjustment of the lordosis support L is ensured.

FIGS. 4 and 5 show a modification of the embodiment of FIGS. 1a to 3c whereby the essential difference lies in the fact that according to FIGS. 4 and 5 the support yokes 11, 12 each extend along the backrest longitudinal direction z and thereby are arranged spaced from each other along the horizontal transverse axis y and parallel to each other. Each of the two support yokes 11, 12 is assigned a support plate T extended in the backrest longitudinal direction z which has a rotational bearing D for the angled end sections 11a, 11b and 12a, 12b of the relevant support yoke 11, 12 and further is provided with a guide rail 3 for each one slider 21, 22 which is assigned to the relevant support yoke 11, 12 and is displaceable along the backrest longitudinal direction z by a spindle drive 4.

Sliding the two sliders 21, 22 is undertaken by one of two spindles 42, 43 mounted parallel to each other and extended in the backrest longitudinal direction z which are each driven by one of two flexible drive shafts 45a, 45b of the drive motor 40 of the spindle drive 4 and which each interact through a threaded section 420, 430 with an associated internal thread 23, 24 of the relevant slider 21, 22.

As the sliders 21, 22 move along the backrest longitudinal direction z by the spindle drive 4 whereby the two sliders 21, 22 which are connected together through a connector element 200 are moved in unison, these in turn interact wedge-like with a curved section 13, 14 of the relevant support yoke 11, 12 so that the support yokes 11, 12—depending on the direction of movement of the sliders 21, 22—are pivoted about their relevant rotational bearing D along one or other direction. With a pivotal movement of the support yokes 11, 12 away from the relevant support plate T and towards the lordosis support L mounted in front of the adjusting device 1, 2, 3, 4 (corresponding to a movement of the sliders 21, 22 towards the end sections 11a, 11b; 12a, 12b of the support yokes 11, 12 which serve as bearings) the lordosis support L is moved along the direction x perpendicular to the extension plane of the backrest frame (y-z-plane) and/or curved. With a pivotal movement of the support yokes 11, 12 along the opposite direction (corresponding to a movement of the sliders 21, 22 towards the free ends of the support yokes 11, 12) the curvature of the lordosis support L can yield or move towards the support plate T of the adjusting device 1, 2, 3, 4.

The fixing of the adjusting device 1, 2, 3, 4 on the backrest frame is also carried out again here through the support plates T.

According to a further development of the adjusting devices described with reference to FIGS. 1a to 5 the relevant sliders 21, 22 are not displaced parallel to the frame plane (yz plane) but rather along a direction with a component along the adjusting direction x of the lordosis support L, as shown diagrammatically in FIG. 6.

FIG. 6 shows a concrete further development of the adjusting device of FIG. 4 in two different adjusting positions of the slider 21 guided by a spindle 42, corresponding to two different pivotal positions of the support yoke 11 which acts correspondingly on the position of the lordosis support L on which the support yoke 11 does indeed act. The essential difference from the adjusting device 1, 2, 3, 4 of FIG. 4 is that the spindle 42 (and thus also the guide rail 3 not shown in FIG. 6 for reasons of clarity) which move and guides the slider 31 is inclined by an angle relative to the extension plane of the backrest frame G (yz plane), thus has a component along the adjusting direction x of the lordosis support L. With a predetermined adjustment path of the relevant slider 21a more marked lifting of the relevant support yoke 11 and thus a more marked displacement or curvature of the lordosis support L can be reached which corresponds in action to a transmission ratio.

Furthermore from the force arrow K entered in FIG. 6 and showing the force action on the support yoke 11 as a vehicle occupant leans back against the lordosis support L it can be seen that through the inclined path of the spindle 42 and thus a corresponding displacement of the slider 21 shorter levers act on the support yoke 11 corresponding to a lower torque load on the support yoke 11.

At the point where with the previous embodiments the relevant support yoke 21 interacts with the lordosis support L special support areas can be arranged e.g. made of plastics and clipped on the support yoke 11 in order to optimise the interaction of the support yoke and lordosis support.

FIGS. 7a and 7b show diagrammatically a further development of the adjusting devices of FIGS. 1a to 5 diagrammatically whereby the FIGS. 7a and 7b show different embodiments of the correspondingly developed adjusting device. Common to both embodiments is that the relevant slider 21 movable along the horizontal transverse axis y or along the backrest longitudinal direction z (depending on whether it is the adjusting device according to FIGS. 1a to 3c or an adjusting device according to FIGS. 4 and 5) is designed ramp-like and has a curved track face 21a for an associated rolling body 26. This rolling body 26 rolls on the associated curved track face 21a of the slider 21 when the slider is moved along the horizontal transverse direction y or the backrest longitudinal direction z and hereby acts on a curved section 13 of the support yoke. 11 which is associated with the slider 21 in order to raise or lower same depending on whether the slider 21 is moved towards the rotational bearing D of the support yoke 11 or away from the rotational bearing D of the support yoke 11.

With the embodiment according to FIG. 7a the rolling body 26 is provided with external toothing 260 through which it interacts on the one side with an associated toothing 210 of the track face 21a of the slider 21 and on the other hand with an associated toothing 110 on the curved surface 13 of the support yoke 11. The rolling body 26 is hereby during its movement along the track face 21a of the slider 210 automatically guided when the slider is moved along the horizontal transverse axis y or along the backrest longitudinal direction z.

The movement of the rolling body 26 thereby is such that it has the tendency to intensify the action of the slider 21 on the support yoke 11, thus as the slider 21 approaches the rotational bearing D to further intensify the lifting or pivoting of the support yoke 11 from the support T, corresponding to the action of a transmission ratio.

With the embodiment illustrated in FIG. 7b the relevant rolling body 26 has the same function as with the embodiment explained previously with reference to FIG. 7a; the difference is only in the guidance of the rolling body 26. With the embodiment illustrated in FIG. 7b the rolling body 26 is attached for pivotal movement by a swivel lever H on a pivotal axis S provided on the support R. The movement of the rolling body 26 along the associated track face 21a of the slider 2 is hereby controlled through the lever H so that also here—as with the embodiment according to FIG. 7a—each position of the slider 21 along the horizontal transverse axis y or along the backrest longitudinal direction is assigned a defined position of the rolling body 26 on the associated track face 21a of the slider 21.

The further development of the adjusting device illustrated in FIGS. 7a and 7b for a lordosis support has the advantage that the rolling body 26 through which the relevant slider 21 is in active connection with the associated support yoke 11 acts as a transmission member which for a given adjusting path of the slider 21 along the horizontal transverse axis y or backrest longitudinal direction z intensifies the corresponding pivotal movement of the support yoke (with a component along the direction x perpendicular to the extension plane of the backrest frame). The structural height of the overall assembly in the adjusting direction x of the lordosis support can hereby be reduced once more.

Furthermore there is a clear reduction in the friction since the slider now interacts through a rolling body 26 with minimised friction with the associated support yoke 11 and a significant contribution to the sliding friction still only stems from the interaction of the relevant slider 21 with the associated guide rail (3).

In each case by using means for defined guidance of the relevant rolling body 26 along the track face 21a of the associated slider 21 e.g. in the form of a lever H or a toothing 210 it is ensured that the rolling body is entrained defined during movement of the slider.

The invention claimed is:

1. A backrest structure for a motor vehicle seat comprising:
a backrest frame which has a front side facing the back of a seat user;
a lordosis support mounted on the front side of the backrest frame for supporting the back of a seat user;
an adjusting device for adjusting the position of the lordosis support perpendicular to a plane defined by the backrest frame;
wherein the adjusting device comprises at least one adjusting element in active connection with the lordosis support and at least one slider which is movable relative to the adjusting element whereby the at least one adjusting element and the at least one slider interact with one another so that when the slider is moved, the adjusting element is moved in a direction having a direction component perpendicular to the direction of movement of the slider and acts in the direction component on the lordosis support;
wherein the at least one slider interacts with the at least one adjusting element through a rotationally symmetrical element whereby the rotationally symmetrical element during movement of the slider rolls down along a track face of the slider;
wherein two sliders are provided which are each movable relative to an adjusting element; and
wherein the two sliders are movable in opposite directions relative to each other.

2. The backrest structure according to claim 1, wherein the at least one slider is displaceable substantially parallel to a plane spanned by the backrest frame.

3. The backrest structure according to claim 1 wherein the at least one slider is displaceable with a direction component perpendicular to a plane spanned by the backrest frame.

4. The backrest structure according to claim 1 wherein the at least one slider is movable along a backrest longitudinal direction along which with an ordinary use of the backrest structure the spinal column of a seat user extends.

5. The backrest structure according to claim 1, wherein the slider is guided by a guide rail.

6. The backrest structure according to claim 1, wherein the two sliders are each movable along a direction which runs transversely to a backrest longitudinal direction.

7. The backrest structure according to claim 1, wherein the two sliders are movable parallel to each other and are spaced from each other perpendicular to the direction of movement.

8. The backrest structure according to claim 7, wherein the two sliders are movable along a backrest longitudinal direction.

9. The backrest structure according to claim 1, wherein the at least one adjusting element is configured as a supporting yoke.

10. The backrest structure according to claim 1, comprising guide means for guiding the rotationally symmetrical element along the track face.

11. The backrest structure according to claim 10, comprising a lever arrangement to guide the rotationally symmetrical element.

12. The backrest structure according to claim 10, wherein to guide the rotationally symmetrical element there are interacting toothed regions of the slider and of the rotationally symmetrical element.

13. The backrest structure according to claim 12, wherein the interacting toothed regions include interacting toothed regions of the adjusting element.

14. The backrest structure according to claim 1, wherein the rotationally symmetrical element is formed by a rolling body.

15. The backrest structure according to claim 1, wherein the at least one adjusting element extends along the direction of movement of the at least one slider.

16. The backrest structure according to claim 1, wherein the at least one slider is movable along a direction which runs substantially perpendicular to backrest longitudinal direction along which with a certain use of the backrest structure the spinal column of a seat user extends.

17. The backrest structure according to claim 1, wherein the adjusting element is swivel mounted so that it is pivoted under the action of the at least one slider and hereby has a motion component perpendicular to the direction of movement of the at least one slider.

18. A backrest structure for a motor vehicle seat comprising:
- a backrest frame which has a front side facing the back of a seat user;
- a lordosis support mounted on the front side of the backrest frame for supporting the back of a seat user;
- an adjusting device for adjusting the position of the lordosis support perpendicular to a plane defined by the backrest frame;
- wherein the adjusting device comprises at least one adjusting element in active connection with the lordosis support and at least one slider which is movable relative to the adjusting element whereby the at least one adjusting element and the at least one slider interact with one another so that when the slider is moved, the adjusting element is moved in a direction having a direction component perpendicular to the direction of movement of the slider and acts in the direction component on the lordosis support; and
- wherein on one of the adjusting element and on the slider there is at least one ramped section through which the adjusting element interacts with the associated slider.

19. The backrest structure according to claim 18, wherein two sliders are provided which are each movable relative to an adjusting element.

20. The backrest structure according to claim 19, wherein the two sliders are movable in opposite directions relative to each other.

21. The backrest structure according to claim 18, wherein the at least one slider interacts with the at least one adjusting element through a rotationally symmetrical element whereby the rotationally symmetrical element during movement of the slider rolls down along a track face of the slider.

22. A backrest structure for a motor vehicle seat comprising:
- a backrest frame which has a front side facing the back of a seat user;
- a lordosis support mounted on the front side of the backrest frame for supporting the back of a seat user;
- an adjusting device for adjusting the position of the lordosis support perpendicular to a plane defined by the backrest frame;
- wherein the adjusting device comprises at least one adjusting element in active connection with the lordosis support and at least one slider which is movable relative to the adjusting element whereby the at least one adjusting element and the at least one slider interact with one another so that when the slider is moved, the adjusting element is moved in a direction having a direction component perpendicular to the direction of movement of the slider and acts in the direction component on the lordosis support;
- wherein the at least one slider interacts with the at least one adjusting element through a rotationally symmetrical element whereby the rotationally symmetrical element during movement of the slider rolls down along a track face of the slider; and
- wherein the track face of the slider runs in the form of a curved track face inclined to a direction of movement of the slider.

* * * * *